(12) United States Patent
Wu et al.

(10) Patent No.: US 10,181,722 B2
(45) Date of Patent: Jan. 15, 2019

(54) SINGLE INDUCTOR, MULTIPLE OUTPUT DC-DC CONVERTER

(71) Applicant: FREESCALE SEMICONDUCTOR, INC., Austin, TX (US)

(72) Inventors: Xiaowen Wu, Shanghai (CN); Lei Tian, Shanghai (CN); Yongqin Liang, Shanghai (CN)

(73) Assignee: NXP USA, INC., Austin, TX (US)

( * ) Notice: Subject to any disclaimer, the term of this patent is extended or adjusted under 35 U.S.C. 154(b) by 310 days.

(21) Appl. No.: 15/256,575

(22) Filed: Sep. 4, 2016

(65) Prior Publication Data

US 2017/0149240 A1    May 25, 2017

(30) Foreign Application Priority Data

Nov. 25, 2015    (CN) .......................... 2015 1 1035133

(51) Int. Cl.
| | |
|---|---|
| *H02J 1/00* | (2006.01) |
| *H02J 3/00* | (2006.01) |
| *H02J 3/14* | (2006.01) |
| *H02M 3/158* | (2006.01) |
| *H02M 1/00* | (2006.01) |

(52) U.S. Cl.
CPC ............... *H02J 1/00* (2013.01); *H02M 3/158* (2013.01); *H02M 2001/009* (2013.01)

(58) Field of Classification Search
CPC ..... H02J 1/00; H02M 3/158; H02M 2001/009
USPC .......................................................... 307/31
See application file for complete search history.

(56) References Cited

U.S. PATENT DOCUMENTS

| | | | |
|---|---|---|---|
| 6,204,651 B1 | 3/2001 | Marcus et al. | |
| 6,977,447 B2 | 12/2005 | May | |
| 2008/0231115 A1 | 9/2008 | Cho et al. | |
| 2013/0099762 A1* | 4/2013 | Terrovitis | H02M 1/32 323/271 |
| 2014/0285014 A1* | 9/2014 | Calhoun | H02M 3/158 307/31 |

\* cited by examiner

*Primary Examiner* — Rexford Barnie
*Assistant Examiner* — Toan Vu
(74) *Attorney, Agent, or Firm* — Charles E. Bergere

(57) ABSTRACT

A single-inductor DC-DC converter generates two DC output voltages at two capacitors. The converter selectively transfers energy from a battery to the inductor or from the inductor to a selected capacitor. While the converter is still settling, the converter is regulated based on only the more deficient DC output voltage. After the converter has already settled, the converter is regulated based on the common-mode voltage for both DC output voltages. By regulating the still-settling converter based on only the more deficient DC output voltage, instead of the common-mode voltage, even greater deficiencies in that already more-deficient DC output voltage are avoided.

8 Claims, 3 Drawing Sheets

SINGLE INDUCTOR, MULTIPLE OUTPUT DC-DC CONVERTER

BACKGROUND

The present invention relates to a DC-DC converter and, more particularly, to a single inductor, multiple output DC-DC converter.

Single inductor, multiple output, DC-DC converters that generate two different DC output voltages using a single inductor are known, for example in U.S. Pat. Nos. 6,204,651 and 6,977,447.

FIG. 4 of the '447 patent shows a single-inductor, multiple-output, DC-DC boost converter. The boost converter alternates between phases in which energy is transferred from a battery to the inductor and phases in which energy is transferred from the inductor to one of two capacitors that generate the two DC output voltages. In addition, the boost converter alternates between periods of charging the first capacitor associated with the first DC output voltage and periods of charging the second capacitor associated with the second DC output voltage based on which of the two DC output voltages is relatively most deficient compared to its desired voltage level.

FIG. 6 of the '447 patent shows a single-inductor, multiple-output, DC-DC buck converter. The buck converter alternates between a phase in which the inductor and one of two capacitors that generate the two DC output voltages are charged by the battery and a phase in which the inductor is discharged. In addition, the buck converter alternates between periods of charging the first capacitor associated with the first DC output voltage and periods of charging the second capacitor associated with the second DC output voltage based on which of the two DC output voltages is relatively most deficient compared to its desired voltage level.

In both converters, the duty cycle of the charge signal that controls the energizing of the inductor is regulated based on the common-mode voltage of the two DC output voltages.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1A:
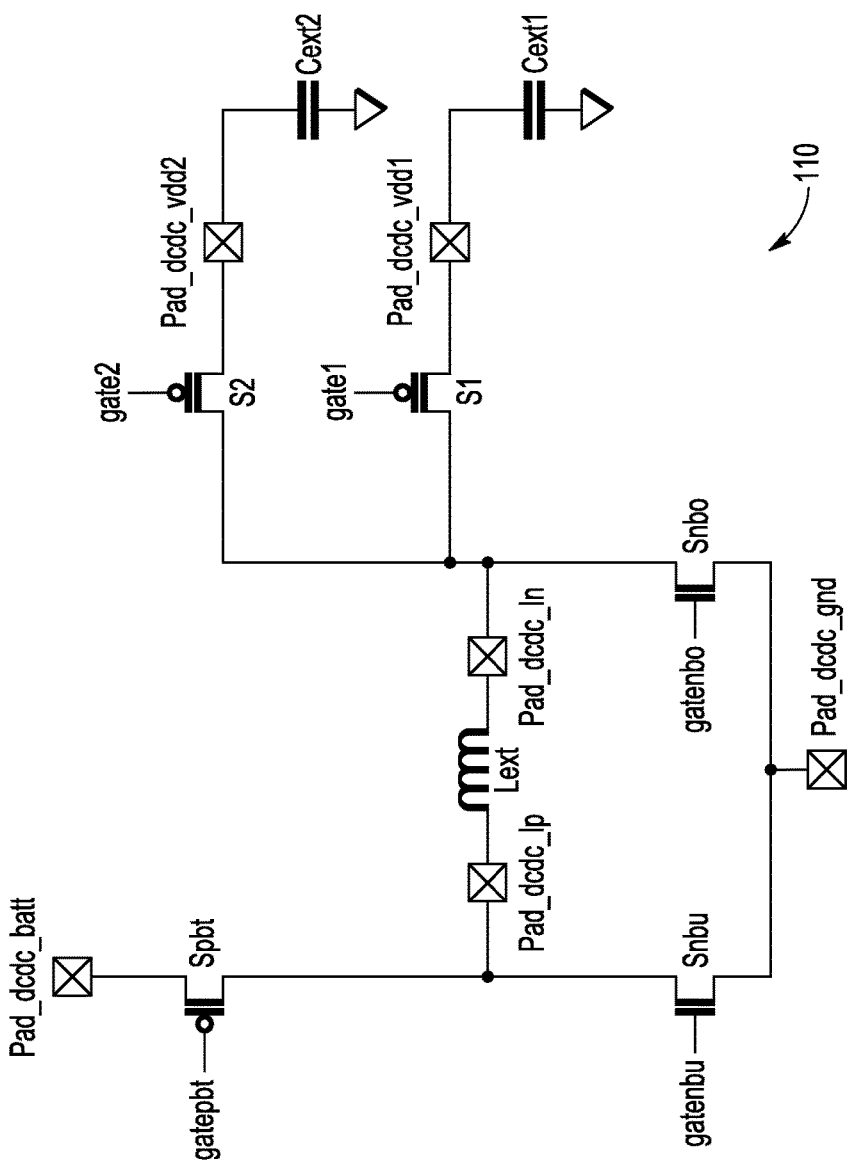
FIG. 1A is a schematic circuit diagram of a switching module for a single-inductor, multiple-output, DC-DC converter according to one embodiment of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the terms "assert" and "de-assert" are used when referring to the rendering of a control signal, status bit, or other relevant functional feature or element into its logical true state and logical false state, respectively. If the logical true state is a voltage level one (i.e., high), then the logical false state is a voltage level zero (i.e., low). Alternatively, if the logical true state is voltage level zero, then the logical false state is voltage level one.

In various alternative embodiments, each logic signal described herein may be generated using positive or negative logic circuitry. For example, in the case of a negative logic signal, the signal is active low, and the logical true state corresponds to a voltage level zero. Alternatively, in the case of a positive logic signal, the signal is active high, and the logical true state corresponds to a voltage level one.

In one embodiment, the present invention is a single-inductor, multiple-output, DC-DC converter for generating at least two DC output voltages. The converter is connectable to a DC power supply, an inductor, and a different capacitor corresponding to each different DC output voltage. The converter comprises (a) a switching module that selectively transfers energy (i) from the DC power supply to the inductor or (ii) from the inductor to a selected one of the capacitors based on switch-control signals and (b) control circuitry that determines whether the converter is still settling or has already settled. If the control circuitry determines that the converter is still settling, then the control circuitry generates the switch-control signals based on only a selected one of the at least two DC output voltages. If the control circuitry determines that the converter is already settled, then the control circuitry generates the switch-control signals based on the at least two DC output voltages.

If one of the two DC output voltage nodes of either the boost or buck converter of the '447 patent is significantly more heavily loaded than the other DC output voltage node, and if the converter is settling from high initial voltage levels, then the voltage level of the more heavily loaded node can drop significantly due to the fact that the duty cycle of the charge signal is regulated based on the common-mode voltage level, while the differential-mode loop control selects the capacitor corresponding to the DC output voltage having the lower relative voltage level to be the capacitor that is charged by the inductor.

Embodiments of the present invention address this problem by regulating the operations of the converter based on only the DC output voltage level that is relatively the most deficient, and not based on the common-mode voltage, while the converter is still settling. After the converter has settled, the operations of the converter can be effectively regulated based on the common-mode voltage as in the '447 patent.

Figure 1B:
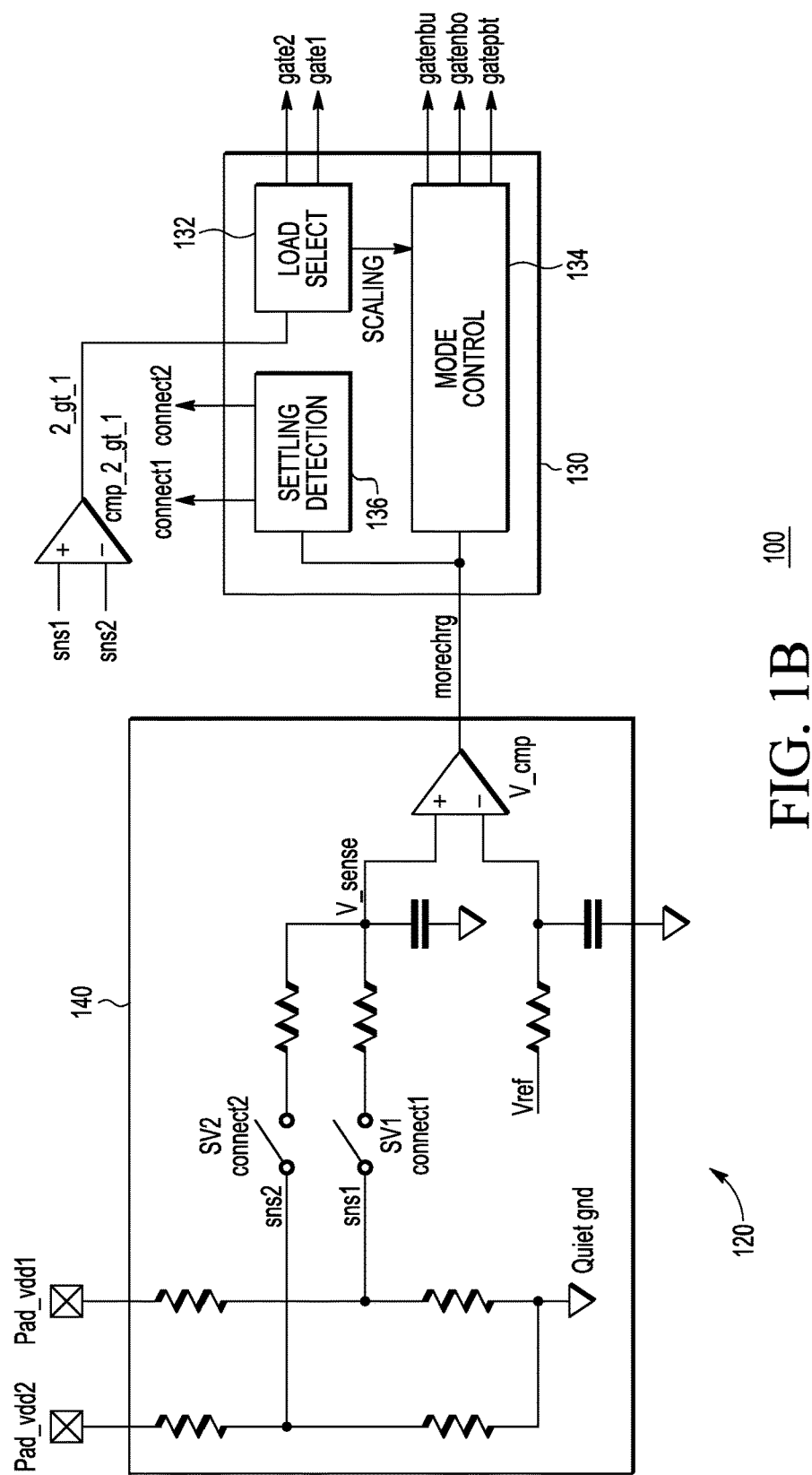
FIG. 1B is a schematic circuit diagram for control circuitry for the switching module of FIG. 1A.

FIGS. 1A and 1B are schematic circuit diagrams for a single-inductor, multiple-output, DC-DC converter 100 according to one embodiment of the invention. In particular, FIG. 1A shows a switching module 110 for the converter 100, while FIG. 1B shows control circuitry 120 for the switching module 110 of FIG. 1A.

The converter 100 simultaneously generates two different DC output voltages vdd1 and vdd2. In one possible application, the converter 100 is implemented on an integrated circuit (IC) that includes other circuitry (not shown), where the DC output voltages vdd1 and vdd2 are each applied to at least some of the other circuitry. As explained below, the converter 100 can be selectively configured to operate as either a boost converter or a buck converter to generate the DC output voltages vdd1 and vdd2.

As shown in FIG. 1A, the converter 100 can be connected to an inductor Lext at I/O pads Pad_dcdc_lp and Pad_dcdc_ln. The converter 100 also can be connected to a battery or other DC power supply (not shown) at I/O pad Pad_dcdc_batt. The converter 100 also can be connected to: a first capacitor Cext1 at I/O pad Pad_dcdc_vdd1; a second capacitor Cext2 at I/O pad Pad_dcdc_vdd2; and a ground voltage at I/O pad Pad_dcdc_gnd. As explained further below, the DC output voltage vdd1 appears at Pad_dcdc_vdd1, while the DC output voltage vdd2 appears at Pad_dcdc_vdd2.

In one possible implementation, the inductor Lext, the battery, and the capacitors Cext1 and Cext2 are all implemented external to the IC on which the converter 100 is implemented. In such an implementation, the IC can be mounted on a printed circuit board (PCB) and electrically connected to the inductor Lext, the battery, and the capacitors Cext1 and Cext2, which are also mounted on the PCB. In other possible implementations, one or more of and possibly all of the inductor Lext, the battery, and the capacitors Cext1 and Cext2 are all implemented on the IC.

The converter 100 comprises a switching module 110 that selectively transfers energy from the battery to the inductor Lext or from the inductor Lext to a selected one of the capacitors Cext1 and Cext2 based on the following five switch-control signals applied to the following five transistor-based switches: (i) a P-type battery switch Spbt that selectively connects the battery at Pad_dcdc_batt to the inductor Lext at Pad_dcdc_lp based on switch-control signal gatepbt; (ii) a N-type buck switch Snbu that selectively connects the ground voltage at Pad_dcdc_gnd to the inductor Lext at Pad_dcdc_lp based on switch-control signal gatenbu; (iii) a N-type boost switch Snbo that selectively connects the ground voltage at Pad_dcdc_gnd to the inductor Lext at Pad_dcdc_ln based on switch-control signal gatenbo; (iv) a P-type vdd1 switch S1 that selectively connects the first capacitor Cext1 at Pad_dcdc_vdd1 to the inductor Lext at Pad_dcdc_ln based on switch-control signal gate1; and (v) a P-type vdd2 switch S2 which selectively connects the second capacitor Cext2 at Pad_dcdc_vdd2 to the inductor Lext at Pad_dcdc_ln based on switch-control signal gate2.

To configure the converter 100 to operate as a boost converter, the battery switch Spbt is closed (i.e., turned on by applying a low switch-control signal gatepbt to the gate of the battery switch Spbt), and the buck switch Snbu is opened (i.e., turned off by applying a low switch-control signal gatenbu to the gate of the buck switch Snbu). When the converter 100 is so configured to operate as a boost converter, the switches Snbo, S1, and S2 are actively controlled (i.e., by applying appropriate switch-control signals gatenbo, gate1, and gate2, respectively, to the gates of the switches Snbo, S1, and S2) to sequentially transfer energy from the battery into the inductor Lext and then from the inductor Lext into either the first capacitor Cext1 or the second capacitor Cext2, depending on which capacitor is more in need of re-charging. In particular, to transfer energy from the battery to the inductor Lext, the boost switch Snbo is closed, and the vdd1 and vdd2 switches S1 and S2 are opened. To transfer energy from the inductor Lext to the first capacitor Cext1, the vdd1 switch S1 is closed, and the boost and vdd2 switches Snbo and S2 are opened. To transfer energy from the inductor Lext into the second capacitor Cext2, the vdd2 switch S2 is closed, and the boost and vdd1 switches Snbo and S2 are opened.

If the converter 100 is operated as a boost converter, when re-charging the first capacitor Cext1, the vdd2 switch S2 is kept off, and the boost and vdd1 switches Snbo and S1 are toggled on and off out of phase with one another to alternate between phases of energizing the inductor Lext and phases of energizing the first capacitor Cext1. Similarly, when re-charging the second capacitor Cext2, the vdd1 switch S1 is kept off, and the boost and vdd2 switches Snbo and S2 are toggled on and off out of phase with one another to alternate between phases of energizing the inductor Lext and phases of energizing the second capacitor Cext2. As explained further below, the durations of those phases and therefore the amounts of energy transferred are controlled based on the duty cycles of the corresponding switch-control signals applied to the gates of those transistor switches.

As shown in FIG. 1B, the switch-control signals gatepbt, gatenbu, gatenbo, gate1, and gate2 are generated by a (e.g., digital) control module 130. The control module 130 performs a load-select function 132 that selects whether the converter 100 is to re-charge the first capacitor Cext1 or the second capacitor Cext2 and generates the vdd1 and vdd2 switch-control signals gate1 and gate2 accordingly. In particular, if the load-select function 132 selects re-charging of the first capacitor Cext1, then the vdd1 switch-control signal gate1 is toggled between low and high to turn on and off the p-type switch S1, and the vdd2 switch-control signal gate2 is driven high to turn off p-type switch S2. Reciprocally, if the load-select function 132 selects re-charging of the second capacitor Cext2, then the vdd1 switch-control signal gate1 is driven high to turn off p-type switch S1, and the vdd2 switch-control signal gate2 is toggled between low and high to turn on and off the p-type switch S2.

The load-select function 132 of the control module 130 is driven by a load-select signal 2_gt_1 generated by a load-select voltage comparator cmp_2_gt_1 that compares two scaled voltage signals sns1 and sns2, which are described further below. In general, if the voltage signal sns1 is lower than the voltage signal sns2, then the first capacitor Cext1 is in more need of re-charging than the second capacitor Cext2. In that case, the load-select signal 2_gt_1 will be high, and the load-select function 132 will generate the switch-control signals gate1 and gate2 to cause the converter 100 to re-charge the first capacitor Cext1. Reciprocally, if the voltage signal sns1 is greater than the voltage signal sns2, then the second capacitor Cext2 is in more need of re-charging than the first capacitor Cext1. In that case, the load-select signal 2_gt_1 will be low, and the load-select function 132 will generate the switch-control signals gate1 and gate2 to cause the converter 100 to re-charge the second capacitor Cext2.

The control module 130 also performs a mode-control function 134 that generates the switch-control signals gatepbt, gatenbu, and gatenbo to (i) select whether the converter 100 is to operate as a boost converter or a buck converter and (ii) select whether the inductor Lext is to receive energy from the battery or to transfer energy to the selected one of the capacitors Cext1 and Cext2 (selected by the load-select function 132 as described above).

The control module 130 is analogous to the combination of the regulation module 34 and the scaling module 36 in FIG. 4 of the '447 patent and can be implemented in an analogous manner.

The control module 130 controls the duty cycles of the switch-control signals that control the durations of the different energy-transfer phases based on a duty cycle control signal more_charge generated by a feedback module 140. In particular, the feedback module 140 comprises a voltage comparator v_cmp that compares a sensed voltage level v_sense to a reference voltage level Vref. Vref may be generated by a band-gap voltage generated, which is powered by vdd2 or some other suitable voltage source such vdd1 or a battery. The sensed voltage level v_sense is generated by a switched, resistor-divider network AG and provides an indication as to whether the rate at which energy is being transferred to the selected capacitor needs to be increased or decreased. In general, if v_sense is less than Vref, then the energy transfer rate needs to be increased, and the duty cycle control signal more_charge will be positive to instruct the control module 130 to increase the duration of the phases during which energy is transferred from the inductor Lext to the selected capacitor. Reciprocally, if v_sense is greater than Vref, then the energy transfer rate needs to be decreased, and the duty cycle control signal more_charge will be negative to instruct the control module 130 to decrease the duration of the phases during which energy is transferred from the inductor Lext to the selected capacitor. In this way, the feedback module 140 helps to regulate the operations of the converter 100 to achieve the desired voltage levels for the two DC output voltages vdd1 and vdd2.

As shown in FIG. 1B, in addition to the network of resistors, the switched, resistor-divider network AG comprises two switches: Sv1, which is controlled by switch-control signal connect1, and Sv2, which is controlled by switch-control signal connect2. If connect1 is high, then the switch Sv1 is closed, and if connect1 is low, then the switch Sv1 is open. Similarly, if connect2 is high, then the switch Sv2 is closed, and if connect2 is low, then the switch Sv2 is open.

In general, if the switches Sv1 and Sv2 are both closed, then the voltage signal v_sense is based on the common-mode voltage (i.e., the average) of the two DC output voltages vdd1 and vdd2. If the switch Sv1 is closed and the switch Sv2 is open, then the voltage signal v_sense is based only on the DC output voltage vdd1. Reciprocally, if the switch Sv1 is open and the switch Sv2 is closed, then the voltage signal v_sense is based only on the DC output voltage vdd2.

Note that the scaled voltage signals sns1 and sns2 that are applied to the load-select comparator cmp_2_gt_1 that was described previously, are generated by the switched, resistor-divider network AG. This is different from the converter of FIG. 4 of the '447 patent, which has two different resistor-divider networks: a first resistor-divider network 42 for the load select module 30 and a second resistor-divider network 46 for the feedback module 32. The converter 100 of the present invention advantageously shares the same resistor-divider network AG for both the feedback module 140 and for the load-select comparator cmp_2_gt_1.

Note that, in the particular implementation of FIGS. 1A and 1B, the I/O pad Pad_dcdc_vdd1 is electrically shorted to the I/O pad Pad_vdd1 via external routing structures (not shown) on the PCB, while the I/O pad Pad_dcdc_vdd2 is similarly electrically shorted to the I/O pad Pad_vdd2 via other routing structures (not shown) on the PCB. In other possible implementations, Pad_dcdc_vdd1 and Pad_dcdc_vdd2 can be electrically shorted to Pad_vdd1 and Pad_vdd2, respectively, via on-chip routing structures on the IC on which the converter 100 is implemented.

As suggested previously, while the converter 100 is still settling (e.g., after initially being powered on), the operations of the converter 100 are regulated based on only the most deficient of the two DC output voltage levels vdd1 and vdd2. After the converter 100 has settled, the operations of the converter 100 are then regulated based on the common-mode voltage, as in the '447 patent. To achieve this goal, the control module 130 also implements a settling-detection function 136 that determines whether the converter 100 is still settling or has already settled and generates appropriate values for switch-control signals connect1 and connect2.

In general, if the converter 100 is still settling and if the scaled voltage signals sns1 and sns2 indicate that the first capacitor Cext1 is in more need of re-charging than the second capacitor Cext2, then the settling-detection function 136 will drive connect1 high and connect2 low to close switch Sv1 and open switch Sv2, such that the converter 100 will be regulated based on only the DC output voltage vdd1. Similarly, if the converter 100 is still settling, but the scaled voltage signals sns1 and sns2 indicate that the second capacitor Cext2 is in more need of re-charging than the first capacitor Cext1, then the settling-detection function 136 will drive connect1 low and connect2 high to open switch Sv1 and close switch Sv2, such that the converter 100 will be regulated based on only the DC output voltage vdd2. If, however, the settling-detection function 136 determines that the converter 100 has already settled, then the settling-detection function 136 will drive both connect1 and connect2 high to close both switches Sv1 and Sv2, such that the converter 100 will be regulated based on the common-mode voltage.

Figure 2:
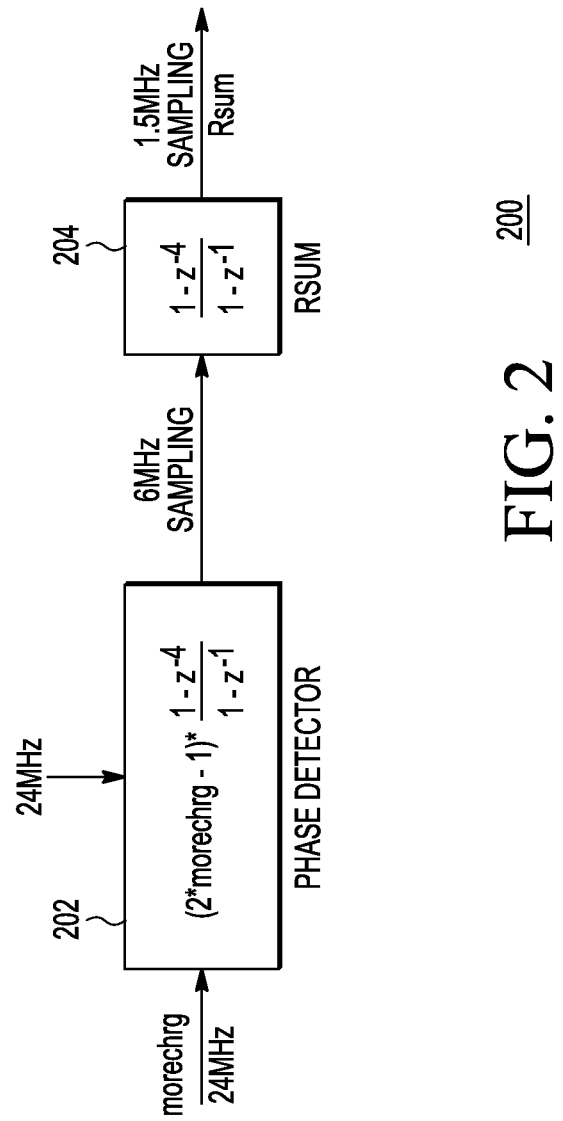
FIG. 2 is a block diagram of a portion of a settling-detection function of FIG. 1B.

FIG. 2 is a block diagram of a portion 200 of the settling-detection function 136 of FIG. 1B. While the converter 100 is settling, the selected DC output voltage used to regulate the duty cycle of the switch-control signals (i.e., the more deficient of vdd1 and vdd2) will oscillate in a damped manner. The portion 200 of the settling-detection function 136 comprises a phase detector 202 and an accumulator 204 that generate a signal Rsum based on the duty cycle control signal more_charge, where the signal Rsum can be tracked to determine when oscillation of the selected DC output voltage vdd1/vdd2 transitions from negative to positive and from positive to negative.

The phase detector 202 oversamples the binary (i.e., 0 or 1) more_charge signal generated by the feedback module 140 based on the frequency Fsample and converted to a ±1 signal by the formula (2*morechrg−1). The phase detector 202 accumulates four 4× oversampled ±1 values during one Fsample/4 period. The phase detector 202 generates a stream of multi-bit signals having the values ±4, ±2, or 0 at a data rate of Fsample/4. The accumulator 204 further accumulates four outputs of the phase detector 202 to generate the accumulated data Rsum at a data rate of Fsample/16. In the example implementation shown in FIG. 2, Fsample is 24 MHz; other implementations may employ other suitable frequencies for Fsample.

Another portion of the settling-detection function (not shown explicitly in the figures) monitors the signal Rsum and counts the number of times that the signal Rsum switches from positive to negative or from negative to positive. The resulting counter value Sign_Count indicates how many oscillations of the selected DC output signal have occurred since the converter 100 was reset (e.g., powered on).

After a specified number of oscillations have been detected and as long as both capacitors Cext1 and Cext2 have been charged at least once, the converter 100 can be said to have already settled, such that the converter 100 can be effectively regulated based on the common-mode voltage rather than based on only the selected DC output voltage vdd1/vdd2. In one possible implementation, according to the step response of a second-order system whose transfer function is:

$$Y(s) = \frac{\omega_n^2}{s^2 + 2\zeta\omega_n s + \omega_n^2},$$

the fourth oscillation occurs between $3*\pi/\omega_d$ and $4*\pi/\omega_d$, where $\omega_d = \omega_n\sqrt{1-\zeta^2}$, where $\omega_d$ is the frequency of oscillation, $\omega_n$ is the undamped, natural frequency, and • is the damping ratio. For a 50-degree phase margin, the settling error after four oscillations is less than 0.1%. As such, after the fourth oscillation has been detected, the converter 100 can be safely determined to have already settled.

In one implementation, the settling-detection function 136 generates a logic signal DcDc_Ok, which indicates whether the converter 100 is still settling (i.e., DcDc_Ok=0) or has already settled (i.e., DcDc_Ok=1), according to the following logical expression:

DcDc_Ok=((2_gt_1_del!=2_gt_1)&&(Reset_Sign_Count==0)&&(Sign_Count>=4)), where the logic signal Reset_Sign_Count is set to 0 when the converter 100 is reset. (Note, "!=" means not equal and "&&" means AND). Every time the converter 100 is started up and every time the output target voltage for vdd1 or vdd2 is changed, the converter 100 needs to be re-settled. In that case, the reset signal Reset_Sign_Count will be asserted to 1 and the signal Sign_Count will be reset to 0 by the reset signal Reset_Sign_Count=1, and then the reset signal Reset_Sign_Count will be de-aserted to 0 at the next clock cycle, and the signal Sign_Count can be re-counted from 0.

The logical expression (2_gt_1_del !=2_gt_1) will be true if the load-select signal 2_gt_1 is not equal to a delayed version 2_gt_1_del of that load-select signal. This logical expression will be true after both capacitors Cext1 and Cext2 have been charged at least one time, otherwise, it will be false.

Reset_Sign_Count will be asserted to 1 (such that (Reset_Sign_Count==0) will be false) at the first cycle when the converter 100 needs to be re-settled; otherwise, Reset_Sign_Count will be de-asserted to 0 (such that (Reset_Sign_Count==0) will be true). The logical expression (Sign_Count>=4) will be true after the settling-detection function 136 has detected at least four oscillations of the selected DC output signal vdd1/vdd2; otherwise, it will be false.

Thus, after the converter 100 has been reset, the logic signal DcDc_Ok will indicate that the converter 100 is still settling until the settling-detection function 136 determines that (i) both capacitors Cext1 and Cext2 have been charged at least once and (ii) at least four oscillations of the selected DC output signal vdd1/vdd2 have been detected. Afterwards, the logic signal DcDc_Ok will indicate that the converter 100 has already settled.

The settling-detection function 136 uses the logic signal DcDc_Ok to generate the switch-control signals connect1 and connect2. In particular, connect1 is generated according to the following logical expression:

connect1=!((2_gt_1_del==2_gt_1)&&(2_gt_1==0)&&(DcDc_Ok==0)).

The logical expression (2_gt_1_del==2_gt_1) will be true in the middle of a phase of operation of the converter 100 in which the selection of the capacitor that is in need of re-charging has not changed from the previous control cycle to the current control cycle. That logical expression will not be true when the selection of the capacitor that is in need of re-charging changes from the first capacitor Cext1 to the second capacitor Cext2, or vice versa. (Note, ! means logic invert; for example "!true" means "false").

The logical expression (2_gt_1==0) will be true if the second capacitor Cext2 is in more need of re-charging than the first capacitor Cext1, otherwise, that logical expression will be false. Thus, if this logical expression is true, then the voltage signal sns2 is lower than the voltage signal sns1 and, if this logical expression is false, then the voltage signal sns2 is greater than the voltage signal sns1.

The logical expression (DcDc_Ok==0) will be true if the converter 100 is still settling; otherwise, the logical expression will be false indicating that the converter 100 has already settled.

Similarly, the switch-control signal connect2 is generated according to the following logical expression:

connect2=!((2_gt_1_del==2_gt_1)&&(2_gt_1==1)&&(DcDc_Ok==0)).

This logical expression is identical to the logical expression for connect1, except that it contains the logical expression (2_gt_1==1) instead of the logical expression (2_gt_1==0). The logical expression (2_gt_1==1) will be true if the first capacitor Cext1 is in more need of re-charging than the second capacitor Cext2.

Thus, while the converter 100 is still settling, if the first capacitor Cext1 is in more need of re-charging than the second capacitor Cext2, then connect1 will be high and connect2 will be low, such that switch Sv1 will be closed and switch Sv2 will be open, and the converter 100 will be regulated based on only the DC output voltage vdd1. Similarly, while the converter 100 is still settling, if the second capacitor Cext2 is in more need of re-charging than the first capacitor Cext1, then connect1 will be low and connect2 will be high, such that switch Sv1 will be open and switch Sv2 will be closed, and the converter 100 will be regulated based on only the DC output voltage vdd2. After the converter 100 has already settled, then both connect1 and connect2 will be high, such that both switches Sv1 and Sv2 will be closed, and the converter 100 will be regulated based on the common-mode voltage.

To operate the converter 100 as a buck converter, the boost switch Snbo is opened, and the battery switch Spbt and the buck switch Snbn are actively controlled along with the vdd1 and vdd2 switches S1 and S2 to control the phase in which the inductor Lext and the selected capacitor Cext1/Cext2 that is in more need of re-charging are charged by a battery and the phase in which the inductor Lext is discharged. As for the boost mode of the converter 100, for the buck mode of the converter 100, while the converter 100 is still settling, the converter 100 is regulated based on only the DC output voltage vdd1/vdd2 that is most deficient. After the converter 100 has already settled, the converter 100 is regulated based on the common-mode voltage. Based on the description provided earlier of the operations of the converter 100 for the boost mode, those skilled in the art will understand the operations of the converter 100 for the buck mode.

Although the invention has been described in the context of the converter 100, which generates two DC output signals vdd1 and vdd2, the invention can be extended to apply to single-inductor, multiple-output DC-DC converters that generate more than two DC output signals. For each additional DC output signal, the converter would have another switched capacitor, the resistor-divider network would have another switched resistor leg, and there would additional comparators analogous to the comparator cmp_2_gt_1.

For example, to support a third DC output signal, the converter would need two more comparators, such as a comparator cmp_3_gt_2 comparing a third scaled voltage signal sns3 to sn2 and a comparator cmp_1_gt_3 comparing sns1 to sns3. In that case, the following logic can be used to select the output voltage most in need of charging:

```
DcDc_Ok=((2_gt_1_del!=2_gt_1)&&
    (3_gt_2_del!=3gt_2)&&(1_gt_3_del!=1gt_3)&&
    (Reset_Sign_Count==0)&&(Sign_Count>=4));

connect1=!((2_gt_1_del==2_gt_1)&&(2_gt_1==0)
    &&(3_gt_2_del==3gt_2)&&(3_gt_2==0)&&
    (1_gt_3_del==1gt_3)&&(1_gt_3==1)&&(DcD-
    c_Ok==0))

connect2=!((2_gt_1_del==2_gt_1)&&(2_gt_1==1)
    &&(3_gt_2_del==3gt_2)&&(3_gt_2==0)&&
    (1_gt_3_del==1gt_3)&&(1_gt_3==0)&&(DcD-
    c_Ok==0))

connect3=!((2_gt_1_del==2_gt_1)&&(2_gt_1==0)
    &&(3_gt_2_del==3_gt_2)&&(3_gt_2==1)&&
    (1_gt_3_del==1gt_3)&&(1_gt_3==0)&&(DcD-
    c_Ok==0))
```

Those skilled in the art will understand how to extend these teachings for numbers of DC output voltages greater than three.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this disclosure, it is understood that all gates are powered from a fixed-voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding terminals, nodes, ports, or paths may be referred to by the same name and are interchangeable for purposes here.

Transistors are typically shown as single devices for illustrative purposes. However, it is understood by those with skill in the art that transistors will have various sizes (e.g., gate width and length) and characteristics (e.g., threshold voltage, gain, etc.) and may consist of multiple transistors coupled in parallel to get desired electrical characteristics from the combination. Further, the illustrated transistors may be composite transistors.

Unless explicitly stated otherwise, each numerical value and range should be interpreted as being approximate as if the word "about" or "approximately" preceded the value or range. It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A single-inductor, multiple-output, DC-DC converter for generating at least two DC output voltages, wherein the converter is connectable to a DC power supply, an inductor, and different capacitors corresponding to each different DC output voltage, the converter comprising:
   a switching module configured to selectively transfer energy (i) from the DC power supply to the inductor or (ii) from the inductor to a selected one of the capacitors based on switch-control signals; and control circuitry configured to determine whether the converter is still settling or has already settled, wherein:

if the control circuitry determines that the converter is still settling, then the control circuitry generates the switch-control signals based on only a selected one of the at least two DC output voltages; and if the control circuitry determines that the converter is already settled, then the control circuitry generates the switch-control signals based on the at least two DC output voltages, wherein the control circuitry comprises:

a settling-detection module that determines whether the converter is still settling or has already settled;

a control module that generates the switch-control signals based on a load select signal and a duty cycle control signal;

a load-select module that generates the load select signal based on a comparison of two scaled voltage signals based respectively on the at least two DC output voltages; and a feedback module that generates the duty cycle control signal, wherein the feedback module is configurable in (i) a still-settling mode if the settling-detection module determines that the converter is still settling and (ii) an already-settled mode if the settling-detection module determines that the converter has already settled, wherein in the still-settling mode, the feedback module generates the duty cycle control signal based on only the selected one of the at least two DC output voltages, and in the already-settled mode, the feedback module generates the duty cycle control signal based on the at least two DC output voltages.

2. The converter of claim 1, wherein, in the still-settling mode, the feedback module generates the duty cycle control signal based on the DC output voltage that is relatively most deficient of the at least two DC output voltages.

3. The converter of claim 1, wherein, in the already-settled mode, the feedback module generates the duty cycle control signal based on a common-mode voltage for the at least two DC output voltages.

4. The converter of claim 1, wherein the settling-detection module determines that the converter has already settled after (i) detecting a specified number of oscillations in the duty cycle control signal and (ii) determining that each capacitor has been charged at least one time.

5. The converter of claim 1, wherein the load-select module and the feedback module share common resistor-divider circuitry.

6. The converter of claim 1, wherein the feedback module comprises a switched, resistor-divider network having a different resistor-divider leg for each different DC output voltage, wherein each resistor-divider leg comprises a switch that is (i) turned on to enable the feedback module to generate the duty cycle control signal based on the corresponding DC output voltage and (ii) turned off to enable the feedback module to generate the duty cycle control signal independent of the corresponding DC output voltage.

7. The converter of claim 1, wherein the converter operates as at least one of a boost converter and a buck converter.

8. The converter of claim 7, wherein the converter is selectively configurable to operate as either the boost converter or the buck converter.

* * * * *